(12) United States Patent
Verret

(10) Patent No.: US 6,976,537 B1
(45) Date of Patent: Dec. 20, 2005

(54) METHOD FOR DECREASING LOST CIRCULATION DURING WELL OPERATION

(75) Inventor: Robin J. Verret, Milton, LA (US)

(73) Assignee: Turbo-Chem International, Inc., Scott, LA (US)

( * ) Notice: Subject to any disclaimer, the term of this patent is extended or adjusted under 35 U.S.C. 154(b) by 268 days.

(21) Appl. No.: 10/248,597

(22) Filed: Jan. 30, 2003

Related U.S. Application Data

(60) Provisional application No. 60/319,106, filed on Jan. 30, 2002.

(51) Int. Cl.$^7$ .......................................... E21B 33/138
(52) U.S. Cl. ................. 166/294; 166/292; 166/300; 175/72; 507/204; 507/211; 507/214; 507/277
(58) Field of Search ................. 166/282, 292, 166/294, 295, 300; 175/72; 507/204, 211, 507/214, 277

(56) References Cited

U.S. PATENT DOCUMENTS

| | | | |
|---|---|---|---|
| 2,890,169 A | 6/1959 | Prokop ........................ 507/129 |
| 3,062,823 A | 11/1962 | McClosky et al. ............. 546/13 |
| 3,078,920 A | 2/1963 | Brink .......................... 166/295 |
| 3,448,800 A * | 6/1969 | Wahl et al. .................. 166/294 |
| 3,511,313 A * | 5/1970 | Eilers et al. ................. 166/295 |
| 3,615,794 A * | 10/1971 | Nimerick ..................... 523/130 |
| 3,743,613 A * | 7/1973 | Coulter, Jr. et al. ........ 523/131 |
| 3,818,998 A * | 6/1974 | Hessert ......................... 175/72 |
| 3,909,421 A | 9/1975 | Gaddis |
| 3,976,552 A | 8/1976 | Fanta et al. ............. 204/159.12 |
| 3,981,100 A | 9/1976 | Weaver et al. .................. 47/58 |
| 4,043,952 A | 8/1977 | Ganslaw et al. ........... 260/17.4 |
| 4,123,366 A | 10/1978 | Sauber et al. |
| 4,124,748 A | 11/1978 | Fujimoto et al. ............... 526/8 |
| 4,128,528 A | 12/1978 | Frisque et al. ............ 260/42.55 |
| 4,155,888 A | 5/1979 | Mooth ........................ 260/17.4 |
| 4,172,066 A * | 10/1979 | Zweigle et al. ............. 523/223 |
| 4,261,422 A | 4/1981 | White et al. ............. 166/305.1 |
| 4,282,928 A * | 8/1981 | McDonald et al. .......... 166/268 |
| 4,289,632 A * | 9/1981 | Clear .......................... 507/104 |
| 4,320,040 A | 3/1982 | Fujita et al. ................. 524/459 |
| 4,391,925 A | 7/1983 | Mintz et al. ................. 523/130 |
| 4,422,947 A | 12/1983 | Dorsey et al. |
| 4,439,328 A * | 3/1984 | Moity .......................... 507/204 |
| 4,442,241 A | 4/1984 | Drake et al. ................. 523/130 |
| 4,445,576 A | 5/1984 | Drake et al. ................. 166/291 |
| 4,475,594 A | 10/1984 | Drake et al. ................. 166/294 |
| 4,503,170 A | 3/1985 | Drake et al. ................. 523/130 |
| 4,635,726 A | 1/1987 | Walker ......................... 166/294 |
| 4,652,384 A | 3/1987 | Francis et al. |
| 4,664,816 A | 5/1987 | Walker |
| 4,822,500 A | 4/1989 | Dobson, Jr. et al. |
| 4,836,940 A | 6/1989 | Alexander |
| 4,914,170 A | 4/1990 | Chang et al. ................. 526/240 |
| 5,032,659 A | 7/1991 | Heidel ......................... 527/300 |
| 5,034,139 A | 7/1991 | Reid et al. |
| 5,086,841 A | 2/1992 | Reid et al. ................... 166/295 |
| 5,439,057 A * | 8/1995 | Weaver et al. .............. 166/295 |
| 5,442,048 A | 8/1995 | Meister et al. ................ 536/20 |
| 5,461,085 A | 10/1995 | Nagatomo et al. .......... 521/183 |
| 5,525,690 A | 6/1996 | Chien et al. ................. 526/160 |
| 5,547,026 A * | 8/1996 | Brannon et al. ............. 166/295 |
| 5,735,349 A * | 4/1998 | Dawson et al. ............. 166/295 |
| 5,804,535 A | 9/1998 | Dobson ....................... 507/111 |
| 5,851,959 A | 12/1998 | Bernu ......................... 507/111 |
| 5,948,733 A | 9/1999 | Cawiezel et al. ........... 507/212 |
| 5,986,042 A | 11/1999 | Irizato et al. ................ 528/328 |
| 6,072,024 A | 6/2000 | Irizato et al. ................ 528/328 |
| 6,239,230 B1 | 5/2001 | Eckert et al. ............. 525/329.7 |
| 6,277,792 B1 | 8/2001 | House ......................... 507/110 |
| 6,291,404 B2 | 9/2001 | House ......................... 507/110 |
| 6,358,889 B2 | 3/2002 | Waggenspack .............. 507/110 |
| 6,474,413 B1 * | 11/2002 | Barbosa et al. ............. 166/270 |
| 6,562,762 B2 | 5/2003 | Cowan et al. .............. 507/110 |
| 6,581,701 B2 * | 6/2003 | Heying ......................... 175/72 |
| 2003/0141062 A1 * | 7/2003 | Cowan et al. .............. 166/294 |

* cited by examiner

*Primary Examiner*—George Suchfield
(74) *Attorney, Agent, or Firm*—Daniel N. Lundeen; Lundeen & Dickinson, LLP

(57) ABSTRACT

A method is provided for reducing lost circulation when aqueous, oil, or synthetic based drilling fluid is used. The method includes injecting two fluids into the well bore and lost circulation zone. The first fluid is an aqueous liquid containing at least one polymer capable of absorbing water in an alkaline environment. The aqueous liquid has a pH that inhibits at least one polymer from absorbing water. The second fluid contains a hardening composition in a base fluid having a pH sufficient to increase the pH in situ to allow at least one polymer to absorb water and expand with the absorbed water and substantially increase in size to close off the lost circulation zone and allow the hardening composition to create a plug in the well bore and set up.

11 Claims, No Drawings

METHOD FOR DECREASING LOST CIRCULATION DURING WELL OPERATION

CROSS REFERENCE TO RELATED APPLICATIONS

This patent application claims priority to U.S. Provisional Patent Application No. 60/319,106 filed Jan. 30, 2002.

BACKGROUND OF INVENTION

The invention relates to a composition and method for reducing lost circulation when aqueous or oil based drilling fluids are used. More particularly, the method involves injecting a first mixture and then a second mixture into the well bore and lost circulation zone. The first mixture is acidic and contains a polymer that absorbs water under alkaline conditions. The second mixture is alkaline and contains a base fluid and a hardening material, wherein the hardening material hardens as the base fluid seeps into the lost circulation zone and increases the pH in situ to the point that the polymer absorbs water and expands. The expanded polymer and hardened material plug fissures and thief zones.

Drilling fluids, or drilling muds as they are sometimes called, are generally slurries of clay solids or polymers used in the drilling of wells in the earth for the purpose of recovering hydrocarbons and other fluid materials. Drilling fluids have a number of functions, the most important of which are: lubricating the drilling tool and drill pipe which carries the tool, removing formation cuttings from the well, counterbalancing formation pressures to prevent the inflow of gas, oil or water from permeable rocks which may be encountered at various levels as drilling continues, and holding the cuttings in suspension in the event of a shutdown in the drilling and pumping of the drilling mud.

For a drilling fluid to perform these functions and allow drilling to continue, the drilling fluid must stay in the borehole. Frequently, undesirable formation conditions are encountered in which substantial amounts, or in some cases, practically all of the drilling fluid may be lost to the formation. Drilling fluid can leave the borehole through large or small fissures or fractures in the formation or through a highly porous rock matrix surrounding the borehole.

Most wells are drilled with the intent of forming a filter cake of varying thickness on the sides of the borehole. The primary purpose of the filter cake is to reduce the large losses of drilling fluid to the surrounding formation. Unfortunately, formation conditions are frequently encountered which may result in unacceptable losses of drilling fluid to the surrounding formation despite the type of drilling fluid employed and filter cake created.

A variety of different substances may be pumped down well bores in attempts to reduce the large losses of drilling fluid to fractures and the like in the surrounding formation. Different forms of cellulose are often employed. Some substances that have been pumped into well bores to control lost circulation include almond hulls, walnut hulls, bagasse, dried tumbleweed, paper, coarse and fine mica, and even pieces of rubber tires.

Another process that is employed to close off large lost circulation problems is referred to in the art as gunk squeeze. In the gunk squeeze process, a quantity of a powdered bentonite is mixed in diesel oil and pumped down the well bore. Water injection follows the bentonite and diesel oil. If mixed well, the water and bentonite harden to form a gunky semi-solid mess, which will reduce lost circulation. Problems frequently occur in trying to adequately mix the bentonite and water in the well. The bentonite must also be kept dry until it reaches the desired point in the well. This method is described in U.S. Pat. No. 3,062,823.

Many of the methods devised to control lost circulation involve the use of water expandable clay such as bentonite, which may be mixed with another ingredient to form a viscous paste or cement. U.S. Pat. No. 2,890,169 discloses a lost circulation fluid made by forming a slurry of bentonite and cement in oil. The slurry is mixed with a surfactant and water to form a composition comprising a water-in-oil emulsion having bentonite and cement dispersed in the continuous oil phase. As this composition is pumped down the well bore, the oil expands and flocculates the bentonite, which, under the right conditions, forms a filter cake on the well bore surface in the lost circulation area. Hopefully, the filter cake will break the emulsion causing the emulsified water to react with the cement to form a solid coating on the filter cake. But, such a complex process can easily go wrong.

U.S. Pat. No. 3,448,800 discuses another lost circulation method wherein a water-soluble polymer is slurried in a nonaqueous medium and injected into a well. An aqueous slurry of a mineral material such as barite, cement or plaster of Paris is subsequently injected into the well to mix with the first slurry to form a cement-like plug in the well bore.

U.S. Pat. No. 4,261,422 describes the use of expandable clay such as bentonite or montmorillonite, which is dispersed in a liquid hydrocarbon for injection into the well. After injection, the bentonite or montmorillonite will expand upon contact with water in the formation, thus, it is hoped that the expanding clay will close off water producing intervals but not harm oil-producing intervals.

A similar method is disclosed in U.S. Pat. No. 3,078,920, which uses a solution of polymerized methacrylate dissolved in a nonaqueous solvent such as acetic acid, acetic anhydride, propionic acid and liquid aliphatic ketones such as acetone and methyl ethyl ketone. The methacrylate will expand upon contact with formation water in the water producing intervals of the well.

It has also been proposed to mix bentonite with water in the presence of a water-soluble polymer that will flocculate and congeal the clay to form a much stronger and stiffer cement-like plug than will form if bentonite is mixed with water. U.S. Pat. No. 3,909,421 discloses such a fluid made by blending a dry powdered polyacrylamide with bentonite followed by mixing the powdered blend with water. U.S. Pat. No. 4,128,528 claims a powdered bentonite/polyacrylamide thickening composition prepared by mixing a water-in-oil emulsion with bentonite to form a powdered composition that rapidly becomes a viscous stiff material when mixed with water. U.S. Pat. Nos. 4,503,170; 4,475,594; 4,445,576; 4,442,241; and 4,391,925 teach the use of a water expandable clay dispersed in the oily phase of a water-in-oil emulsion containing a surfactant to stabilize the emulsion and a polymer dispersed in the aqueous phase. When the emulsion is sheared, it breaks and a bentonite paste is formed which hardens into a cement-like plug. The patent discloses the use of such polymers as polyacrylamide, polyethylene oxide and copolymers of acrylamide and acrylic or methacrylic acid.

U.S. Pat. No. 4,124,748 discloses a cross-linked copolymer of a vinyl ester and an ethylenically unsaturated carboxylic acid or derivative thereof that can absorb 200–800% of its weight in water and expand substantially in volume when doing so. Another highly water absorbent, expanding copolymer is described in U.S. Pat. No. 4,230,040. The described compound is derived by polymerizing acrylic acid and/or methacrylic acid in the presence of polyvinyl alcohol, followed by neutralization and heat treatment.

U.S. Pat. No. 4,635,726 discloses the use of superabsorbent polymers dispersed or suspended in a liquid hydrocarbon for injection into a well and placed at the location where lost circulation is occurring. After placement and upon mixing with water, the superabsorbent polymer expands thus decreasing the loss of fluid from the well bore.

U.S. Pat. Nos. 4,664,816; 4,836,940; 5,034,139; and 5,086,841 disclose various methods of utilizing water absorbent polymers to decrease the loss of circulation fluid in a well bore.

SUMMARY OF INVENTION

The method of the present invention is used for reducing lost circulation when aqueous, oil or synthetic based drilling fluids are used. The method involves injecting a first mixture and then a second mixture into the well bore and lost circulation zone. The first mixture is acidic and contains at least one polymer that absorbs water under alkaline conditions. The second mixture is alkaline and contains a base fluid and a hardening composition, wherein as the base fluid seeps into the lost circulation zone the hardening composition hardens and the base fluid increases the pH of the first mixture so that the polymer absorbs water and expands, substantially increasing in size. The expanded polymer and hardened composition plug fissures and thief zones closing off the lost circulation zone. The hardened composition may also plug the well bore. However, the hardened composition is less hard than cement and easily drilled through without deviation of the borehole. A final step is circulating the drilling fluid or otherwise removing undesired compounds from the borehole.

The invention preferably comprises providing an additive for preparing a gellable composition, as part of the first mixture to combat lost circulation in a subterranean thief zone, which comprises a superabsorbent polymer, chitosan, and an acid, preferably a solid acid.

The invention also comprises a hardening composition useful as an additive for preparing the second mixture. In the second mixture, the ingredients of the hardening composition are added to the base fluid, which may be water, hydrocarbon, or synthetic. The ingredients of the hardening composition are diatomaceous earth, a suspending agent such as finely divided paper, lime, a loss control material (LCM) such as micronized cellulose fiber, sodium silicate and sulfate. It is believed that the lime reacts with the sodium silicate to yield calcium silicate, and that the sulfate also reacts with the lime to form calcium sulfate. These reactions result in a harder product than without the sulfate and/or sodium silicate, but a product that is not too hard so as to facilitate drilling through the plug.

In one embodiment, the method involves dispersing a water absorbent polymer in an acidic aqueous liquid, which will prevent the polymer from absorbing water and expanding to plug fissures and thief zones until water absorption is desired, injecting the resulting fluid into the well bore and lost circulation zone, preparing a mixture by combining diatomaceous earth, finely divided paper, lime, micronized cellulose fiber, sodium silicate (naturally occurring in the diatomaceous earth and/or as a separate ingredient) and sulfate (naturally occurring in the micronized cellulose fiber and/or as a separate ingredient), optionally with cotton lentil and/or derivatized corn starch, in a base fluid, and injecting the mixture into the well bore and lost circulation zone, wherein the base fluid increases the pH and allows the polymer to absorb water and expand to plug fissures and thief zones and the mixture hardens in and on the well bore as the base fluid seeps into the formation.

DETAILED DESCRIPTION

Drilling fluids are formulated to intentionally seal porous formations during drilling in order to stabilize the borehole and to control fluid loss. However, formations are frequently encountered that are so porous as to increase the loss of drilling fluids beyond an acceptable limit despite the use of lost circulation additives. Furthermore, a borehole may penetrate a fracture in the formation through which most of the drilling fluid may be lost.

In order to close off large pores and fractures that drain drilling fluid from the borehole, it is necessary to place the lost circulation material at the proper location and to be able to clean up the well bore after treatment is completed. The present invention offers a method for accomplishing this in a borehole whether the well is being drilled with aqueous drilling fluids, oil based drilling fluids or synthetic based drilling fluids. The invention involves the use of a polymer that expands substantially in volume when absorbing water. An acidic aqueous liquid carrier fluid is used to place the polymer at and in the lost circulation zone. Contact with a base or high pH alkaline fluid results in water absorption by the polymer, causing the polymer to increase significantly in volume, blocking off the lost circulation zone.

In the present invention, mixing with a high pH alkaline fluid is brought about by the use of a separate slug of the second mixture which contains the base fluid, the hardening composition and a base in an amount sufficient to elevate the pH in situ to the point where the polymer absorbs water.

Any polymer, which will significantly increase in size or volume after absorption of water at a basic pH, may be dispersed with the acidic aqueous liquid to practice the present invention. A class of water absorbent polymers known as superabsorbent polymers performs very well.

Superabsorbent polymers absorb many times their own weight in water, causing the polymer volume to drastically expand. Several of these preferred highly water absorbent polymers are alkali metal polyacrylates including J-500 and J-550, trademarked sodium polyacrylate polymers sold by Grain Processing Co.; A-100, a trademarked starch graft copolymer of polyacrylic acid and polyacrylamide sold by Grain Processing Co.; A-400, a trademarked polyacrylamidecosodium acrylate sold by Grain Processing Co.; and B-200, a trademarked potassium salt of A-400 sold by Grain Processing Co.

The amount of water these superabsorbent polymers absorb is astounding. The J-500 polymer will absorb 375 ml of water per gram of J-500 polymer. The A-100 polymer will absorb 140 ml of water per gram of polymer. However, salt water has an adverse effect on water absorption. The addition of 0.4% NaCl to water will decrease the absorption of A-100 to 55 ml of water per gram of A-100 and decrease absorption of J-500 from 375 ml to 100 ml of water per gram of J-500.

Another group of water absorbent polymers which perform well in the invention are prepared by polymerizing one or more of the acids from the group consisting of acrylic acid and methacrylic acid in the presence of polyvinyl alcohol, neutralizing the polymer, and heat treating the polymer at about 50° C. to about 150° C. These polymers may also be crosslinked by carrying out the polymerization in the presence of a crosslinking agent. The hydrophilic gel polymers prepared according to the method are disclosed in U.S. Pat.

No. 4,230,040, the disclosure of which is incorporated herein by reference. Starch graft copolymers are well known superabsorbents. See, for example, U.S. Pat. Nos. 3,976,552; 3,981,100; 4,155,888; 5,032,659; and 5,525,690; all incorporated herein by reference.

Surface-treated superabsorbent polymer particles are disclosed in U.S. Pat. No. 6,239,230; other synthetic superabsorbent polymers in U.S. Pat. Nos. 4,043,952; 4,914,170; 5,461,085; 5,986,042; and 6,072,024; all incorporated herein by reference.

All of these polymers expand substantially in size upon water absorption and absorb many times their weight in water.

Saponified copolymers of a vinyl ester and a compound selected from the group consisting of ethylenically unsaturated carboxylic acids and derivatives of ethylenically unsaturated carboxylic acids may also be employed. U.S. Pat. No. 4,124,748, the disclosure of which is incorporated herein by reference, states that these copolymers may also be cross-linked by polymerizing in the presence of a crosslinking agent. The crosslinking agent may include polyallyl compounds such as diallyl phthalate, diallyl maleate, diallyl tetraphthalate, triallyl cyanurate or triallyl phosphate, polyvinyl compounds such as divinyl benzene, N,N'-methylene-bis-acrylamide, ethylene glycol diacrylate, ethylene glycol dimethacrylate or glycerin trimethacrylate, allyl acrylate and allyl methacrylate, and the like. As the degree of crosslinking is increased with an increase in the amount of crosslinking agent, the water absorbing ability decreases. Thus, only a moderate amount of crosslinking is desired. These polymers increase significantly in size when absorbing as much as ten times their own weight in water. Furthermore, their gel formation ability is stable in a hydrated state for a long period of time.

If the polymer is structurally weak, a substrate may be used to help support the polymer. Of course, other compounds that absorb water and expand in size which are not specifically mentioned herein may also be used to control lost circulation according to the invention.

One embodiment of the method of practicing the invention involves the injection of a discrete slug (or "pill") of acidic aqueous liquid (hereinafter sometimes referred to as "AAL") containing the superabsorbent polymer therein into the well bore, wherein the AAL slug contains the water absorbent polymer in a proportion sufficient to seal off the lost circulation zone upon contact with a base. Depending on the polymer and the composition of the AAL slug, about 1 to about 5 pounds of water absorbent polymer per barrel, more preferably, about 2 to about 4 pounds of polymer per barrel, can be incorporated with the AAL slug. The AAL slug is also referred to herein as a "gellable composition." Preferably, the AAL slug will additionally contain a viscosifier to increase the viscosity and suspension characteristics of the AAL slug. This will maintain the supersabsorbent polymer dispersed throughout the AAL slug during storage and downhole placement thereof. Representative viscosifiers are polysaccharides, particularly biopolymers such as xanthan gum and scleroglucan gum and chitosan and derivatives thereof. Generally, the concentration of the viscosifier will be from about 1 to about 10 pounds per 42-gallon barrel of the AAL.

The AAL slug with polymer therein is spotted at the lost circulation zone and preferably, forced into the lost circulation zone by pumping. Depending on the character and size of the lost circulation zone, as little as 100 gallons of the slug and polymer may be needed. Preferably, an aqueous spacer fluid or slug is employed as a spacer between the polymer slug from the slug of second mixture to insulate the polymer slug from the alkaline second mixture and to force the slug and polymer into the lost circulation zone. If the well is being drilled with an aqueous mud, it is also preferred to employ a viscous aqueous slug without superabsorbent polymer as a spacer between the AAL slug and the second mixture slug, and preferably also before the AAL slug and after the second mixture slug to prevent any dilution of these slugs. These spacer slugs will prevent the second mixture slug from mixing with the AAL slug and expanding the polymer prior to entry of the polymer into the lost circulation zone.

When the second mixture comes into intimate contact with the AAL slug containing the polymer, the base fluid of the second mixture will seep into the formation and increase the pH in situ. This will allow the polymer to absorb the water and expand in the formation and borehole, closing off the lost circulation zone and creating a bridge where the hardening composition may collect, and allowing the hardening composition to set after a brief setting time. The undesired compounds may be circulated out of the borehole. Also, the hardened composition plug may be easily drilled through. It is a preferred practice to raise the drill stem and bit above the lost circulation zone so that after the lost circulation zone is sealed off, the drill stem and bit can be brought back down to flush and clean the expanded polymer and any unhardened second mixture from the well bore.

The polymer particles may be sized over a wide range. The size of the passages through the circulating jets in the drill bit is the absolute maximum particle size. However, the polymer should be of a small enough size so as to be able to enter the formation through fissures, small fractures and large pores. A preferred range of particle size is about 0.1 microns to 5 millimeters. The particles should be sized according to the properties of the formation and the lost circulation zone.

Any AAL may be employed as a carrier fluid if it will not degrade the superabsorbent polymer. Thus, aqueous acidic liquids containing inorganic acids or organic acids can be the carrier fluid. Representative non-limiting acids include hydrochloric acid, sulfamic acid, carboxylic acids containing from 1 to 6, preferably 1 to 3 carbon atoms, sulfonic acids containing from 1 to 6 carbon atoms, preferably 1 to 3 carbon atoms, and the like. Particularly preferred is sulfamic acid. Sulfamic acid is a solid and can be admixed with the superabsorbent polymer to provide an additive, which can be added to an aqueous liquid to produce the AAL slug or pill for placement in a borehole. Preferably the AAL slug will have a pH less than about 4.5, most preferably less than about 4.0.

The gellable composition, that is the first mixture, may also contain other materials that also aid in relieving lost circulation during drilling or the loss of fluid during well servicing. Thus, the gellable composition may also contain any of the known such materials, generally called "LCM." These include bagasse, flax, straw, ground hemp, shredded paper, paper pulp, cellophane strips, ground plastics, mica flakes, expanded perlite, silica slag, diatomaceous earth, ground bark, cottonseed hulls, cotton linters, nut hulls or shells, seed husks, and the like. As indicated, a vast assortment of materials have been used in drilling fluid compositions as formation sealing agents to seal high permeability thief formations in attempts to restore lost circulation of the drilling fluid where a lost circulation condition has been encountered. It is preferred that finely ground paper be incorporated into the gellable composition as needed for additional sealing.

The gellable composition may also contain any of the known weight materials, preferably barite, to increase the density of the gellable composition if necessary as is well known in the art. Usually, it is immediately apparent when the well bore penetrates a fracture. The mud pressure will drop and less drilling fluid will be circulated back to the top of the hole. Large fractures can be responsible for draining off almost all of the drilling fluid. When this occurs, the AAL slug containing the polymer should be injected into the well bore and spotted at the lost circulation zone. Then, one of several alternative procedures may be followed, with some steps depending upon whether an aqueous drilling fluid or an oil based drilling fluid is being used.

In one method, the AAL and polymer (AALP) slug is pumped down the tubing string and back up the annulus to the lost circulation zone, while pumping a second mixture slug down the annulus to meet with the AALP slug at the lost circulation zone. Pressure can be applied to both the AALP and the second mixture slugs to force both fluids into the lost circulation zone, where mixing and polymer expansion and hardening composition setting will occur. Another method is to spot the AALP slug at the lost circulation zone and then inject a second mixture slug through the tubing string directly to the lost circulation zone to mix with the AALP slug. Of course, other methods known in the art may also be used to mix the second mixture slug with the AALP slug at the location of the lost circulation zone.

There is disclosed in co-pending U.S. patent application Ser. No. 09/898,856 filed Jul. 3, 2001, incorporated herein by reference, a process of reducing the loss of fluid into flow passages of a subterranean formation during well drilling, completion, or workover operations comprising introducing into the flow passages an aqueous liquid comprising water, a partially hydrated chitosan the particles of which have been partially hydrated in the water at an acidic pH less than about 4.5, and a base to raise the pH of the liquid above about 6.5, most preferably above about 8.0. Incorporating a superabsorbent polymer in the acidic chitosan-containing fluid further decreases the loss of fluid from the fluid present in a borehole. Thus, upon raising the pH above about 8.0 of a slug or pill of an aqueous acidic liquid containing both chitosan and a superabsorbent polymer, a polymer plug is formed at the location of the loss of fluid in a borehole after placement of the slug therein. Such an AALP slug will preferably contain from 3 to about 10 pounds per 42 gallon barrel of chitosan and from about 2 to about 10 pounds per 42 gallon barrel of the superabsorbent polymer.

In accordance with another preferred embodiment of the invention, an additive comprising a solid mixture of the chitosan, superabsorbent polymer, and a solid acid such as sulfamic acid can be provided which, when mixed with an aqueous liquid, will produce an AALP slug for placement in a borehole. The preferred weight ratio of chitosan: superabsorbent polymer: sulfamic acid is within the range of 30%–55% chitosan, 20%–50% superabsorbent polymer, and 10%–40% sulfamic acid. The preferred chitosan has a degree of acetylation from 0% to about 70%.

The AALP slug preferably contains from about 5 pounds per 42 gallon barrel to about 25 pounds per 42 gallon barrel of the additive.

Several of the materials utilized in the second mixture are identified in U.S. Pat. No. 4,289,632, which is hereby incorporated herein by reference. However, the use of the sodium silicate and/or sulfates yield a more durable sealing material and forms a hard plug, rather than a soft well bore cake. The plug is sufficiently soft to allow easy drilling therethrough without causing the drilling to be diverted off track.

The finely divided paper can be in any form effective to act as a suspending agent for the diatomaceous earth, for example, finely shredded or divided paper, ground paper, and the like. Particularly satisfactory results have been obtained using finely divided paper. Such paper is available, for example, from Buckeye Mud Corporation, Midland, Tex., in fifty-pound sacks. However, any suitable paper for suspending the diatomaceous earth, for example, ground paper from such as newspapers, can be employed in accordance a with the instant invention. The amount of paper employed is an amount effective to adequately suspend the other lost circulation materials, for example, diatomaceous earth, lime, nut shells, if present, and the like and other materials such as weighting materials, for example, barite and the like. Preferably, the amount of paper employed to stabilize the slurry is at least 2 percent by weight of the composition of the second mixture excluding the base fluid. Broadly, the amount of paper can range from about 2 percent by weight to about 30 percent by weight. A preferred range is from about 4 to about 20 percent by weight, more preferably from about 8 to about 15 percent by weight. A more preferred level is about 10 to about 13 percent paper by weight to provide excellent suspending activity for the diatomite without unduly increasing the viscosity or unduly restricting water loss.

Diatomaceous earth, also known as diatomite, infusorial earth, or kieselguhr, is composed of the silicaceous skeletons of diatoms. Diatomaceous earth is abundantly available and relatively inexpensive and is known in the art as a fluid permeable filter cake forming formation-sealing agent. The diatomaceous earth functions as a high fines solid to assist in forming a permanent seal of permeable formations. The amount of diatomaceous earth employed in the second mixture, excluding the base fluid, preferably comprises at least 25 percent by weight of said composition and more preferably is in the range from about 25 weight percent to about 60 weight percent. An especially preferred level is from about 30 percent to about 35 percent by weight.

The second mixture also includes lime (calcium hydroxide). The lime is believed to react with the sodium silicate to form calcium silicate and the sulfate to form calcium sulfate. Preferably, the lime can range from about 10 to about 50 weight percent. More preferably the amount of lime can range from about 26 to about 38 weight percent, and most preferably from about 30 to about 35 percent by weight of the mixture, excluding the base fluid.

If the lime is insufficient to raise the pH in situ to allow the polymer to absorb water, the second mixture may include an additional base in a sufficient amount to achieve the necessary pH in situ to allow the polymer to absorb water. Any suitable base may be used, for example, caustic (sodium hydroxide) or soda ash (sodium carbonate).

The second mixture also includes a loss control material such as micronized cellulose fiber, e.g. ground wood such as that commercially available under the trade designation PREMIUM SEAL® coarse or fine ground wood. The micronized cellulose fiber preferably is present in the second mixture at from 10 to 40 weight percent, more preferably from 15 to 35 weight percent, and especially from 20 to 30 weight percent of the mixture, excluding the base fluid.

The second mixture also includes sodium silicate, preferably in the range of about 0.5 to about 5 percent by weight, excluding the base fluid. The sodium silicate can occur naturally in the diatomaceous earth, however, if the diatomaceous earth does not contain sufficient amounts of sodium silicate or if additional sodium silicate is desired, it can be supplemented by amendment to the appropriate level.

The second mixture also includes sulfate, preferably ranging from about 0.5 to about 5 percent by weight, excluding the base fluid. Sulfate can be added separately in the form of sodium sulfate, for example, or can be added with a loss control material or as a naturally occurring constituent of the micronized cellulose fiber.

The second mixture can be prepared by proportioning materials including finely divided paper, diatomaceous earth, lime, micronized cellulose fiber, sodium silicate (if added separately) and sulfate (if added separately) by weight in accordance with the above description of the composition of matter, and mixing the thus proportioned materials to form a generally homogeneous mixture.

The base fluid for the second mixture may be water, either fresh water or salt water, or oil or synthetic.

As is known, the density of a drilling fluid is an important parameter. To prevent blowout, the uncontrolled flow of fluids from the formation into the well, the drilling fluid must have a density effective to provide a greater pressure than that exerted by the formation fluids. However, densities must not be too high, because excessive hydrostatic pressures can cause further loss of circulation. Weighting materials to increase the density of drilling fluids are frequently added to such fluids, for example, ground barite, the widespread and common form of barium sulfate and the like can be used. Accordingly, the second mixture can further comprise a weighting material such as ground barite and the like added to adjust the density of the second mixture to a desired level.

If desired, conventional bridging materials can be added to the second mixture. In general, formation-sealing agents may be classified either as surface plugging, interstitial bridging, or a combination of plugging and bridging. Various formation-sealing agents have heretofore been used in the art to form formation seals and/or filter cakes on the wall of a well bore. These include sugar cane fibers or bagasse, flax, straw, ground hemp, cellophane strips, ground plastics, mica flakes, expanded perlite, silica slag, ground fir bark, ground redwood bark and fibers, grape extraction residue, cottonseed hulls, cotton bolls, ginned cotton fibers, cotton linters, and the like. If fluid absorbent lost circulation materials are used, the viscosity of the second mixture will increase. The slurry is also effective without additional conventional lost circulation materials.

Another material that may be added to the second mixture is starch or derivatized starch as a gelling agent. Any suitable granular starch or mixture of starches may be used in the invention. Accordingly, as used herein, the term "starch" is understood to include one or more natural starches, one or more chemically modified starches, and mixtures of one or more natural and/or chemically modified starches. Natural starches that may be employed in the invention include, but are not limited to, those of potato, wheat, tapioca, rice, corn and roots containing high starch content. Depending on their source, starches may contain both amylose and amylopectin molecules, or they may contain substantially all amylopectin or substantially all amylose. Waxy starches, which are virtually all amylopectin molecules, for example, waxy cornstarch, are preferred. Blends of waxy starches with minor amounts of amylose-containing starch may also be employed. Preferably, pre-gelatinized starches are employed. Pre-gelatinized starches may be obtained commercially or they may be prepared by pre-gelatinization treatment. For pre-gelatinization, the chosen starch granules are heated in water to a point where the starch granules swell irreversibly. Upon cooling, this swollen structure is retained. The use of pre-gelatinized starches yields an important advantage to the combination of the invention, since these materials are stable at higher temperatures in the formation, e.g., up to 300° F. Chemically modified starches are those derived from natural starches by chemical reaction of a natural starch with a suitable organic reactant. Chemically modified starches which may be used in the invention include, but are not limited to, carboxymethyl starch, hydroxyethyl starch, hydroxypropyl starch, acetate starch, sulfamate starch, phosphate starch, nitrogen modified starch, starch crosslinked with aldehydes, epichlorohydrin, borates, and phosphates, and starches grafted with acrylonitrile, acrylamide, acrylic acid, methacrylic acid, maleic anhydride, or styrene. Preferred among the modified starches are hydroxypropyl and carboxymethyl starches. While granule size of the starch particles is not critical, commercially available sizes being suitable, a preferred range of dry particle sizes is from about 5 microns to about 150 microns. Various starches and chemically modified starches useful in the present invention are disclosed in U.S. Pat. Nos. 4,652,384; 4,822,500; 4,422,947; 4,123,366; 5,804,535; 5,851,959; and 5,948,733, which are hereby incorporated by reference.

The pre-blended solid ingredients of the second mixture without the weighting material and base fluid can be blended with the weighting material and the base fluid prior to use to obtain the desired second mixture density. For the pre-blend which is commercially available as one example from Turbo-Chem International, Inc. under the trademark EZ SQUEEZE®, as one example, the second mixture is blended according to Tables 1 and 2:

TABLE 1

Formula For Preparing One Barrel Second Mixture Slurry in Fresh Or Sea Water

| Density | E Z SQUEEZE ® Pre-blend | | Barite* | Water*** |
|---|---|---|---|---|
| Lb/gal | lb | sacks | Sacks | bbl |
| 9 | 100 | 4.00 | 0.0 | 0.75 |
| 10 | 100 | 4.00 | 0.6 | 0.72 |
| 11 | 94 | 3.75 | 1.2 | 0.70 |
| 12 | 84 | 3.25 | 1.8 | 0.67 |
| 13 | 78 | 3.15 | 2.3 | 0.65 |
| 14 | 70 | 2.75 | 2.9 | 0.63 |
| 15** | 62 | 2.50 | 3.5 | 0.60 |
| 16 | 56 | 2.25 | 4.0 | 0.58 |
| 17 | 50 | 2.00 | 4.6 | 0.56 |
| 18 | 44 | 1.75 | 5.2 | 0.53 |
| 19 | 34 | 1.25 | 5.8 | 0.51 |

*If saturated salt water is used, barite must be decreased by 0.6 sacks per barrel.
**For squeeze pills equal to or greater than 15.0 ppg use E Z THIN ™ @ 5 gallon per 8 BBLS of slurry.
***Add 1–2 pails defoamer to mix water before adding any E Z SQUEEZE ® pre-blend. All E Z SQUEEZE ® pre-blend must be mixed prior to adding barite.

TABLE 2

Formula For Preparing One Barrel Second Mixture Slurry with Oil or Synthetic

| Density | E Z SQUEEZE ® Pre-blend | | Barite | Oil/Syn* |
|---|---|---|---|---|
| Lb/gal | lb | sacks | sacks | bbl |
| 8 | 88 | 3.50 | 0.38 | 0.616 |
| 9 | 82 | 3.25 | 0.88 | 0.599 |
| 10 | 75 | 3.00 | 1.38 | 0.581 |
| 11 | 70 | 2.75 | 1.88 | 0.564 |
| 12 | 64 | 2.60 | 2.38 | 0.539 |
| 13 | 60 | 2.40 | 2.90 | 0.522 |
| 14 | 54 | 2.20 | 3.43 | 0.504 |
| 15 | 48 | 1.90 | 3.97 | 0.487 |
| 16 | 44 | 1.74 | 4.52 | 0.469 |
| 17 | 38 | 1.50 | 5.08 | 0.458 |
| 18 | 32 | 1.25 | 5.65 | 0.427 |

*Due to variations in oil or synthetic & barite; pilot tests should be made to determine exact formulations. If slurry becomes too thick, add up to 1 lb./bbl. wetting agent to thin.

The second mixture slurry is preferably prepared from a pre-blended admixture of the dry ingredients without weighting agent or base fluid in the proportions of Tables 1 or 2 to obtain the slurry of the desired weight. The slurry can be mixed in a clean, uncontaminated mud pit and pumped with rig pumps. Typically the operator mixes twice the open hole volume, or a minimum of 100 bbls of second mixture slurry for longer open hole intervals. Ideally, enough slurry should be available to cover all potential loss zones, as well as enough excess volume available for squeezing operations.

Preparing the second mixture slurry begins with approximately 80 percent of the desired volume of fluid (oil/synthetic or water as per Table 1 or 2 above). To the fluid, the operator adds 10 sacks pre-blend composition and 5 gallons of defoamer (when using water); then barite, and the remainder of the fluid. The operator follows this with additional LCM (loss circulation material) as required or desired. Generally, a weighted slurry should have about the same density as the drilling mud in use. Some additional LCM (for example, PREMIUM SEAL® Coarse, available from Turbo-Chem) in the slurry will often be beneficial. PREMIUM SEAL® Coarse is a deformable and compressible micronized cellulose fiber which is compatible with water, oil, and synthetic based muds and has been specially designed to seal permeable formations. The optimum particle size distribution (PSD) of graded fibrous particles creates a bridging action within a fraction of an inch in the borehole and a matting effect within the mud wall cake. From 5–20 ppb total LCM can be added depending upon conditions. The second mixture slurry can be pumped through the bit, but excessive concentrations of LCM should be avoided, and the LCM should be smaller than the nozzle sizes to avoid plugging. The operator should always test the slurry, to insure high fluid loss, prior to pumping. For water-based slurries, an API filter press pressured to 100 psi should de-water in approximately 1 minute. For oil-based slurries, an HTHP filtration cell heated to 150° F., and pressured to 200 psi (or the metric equivalent) should de-oil in 1.5 minutes.

No special equipment is needed to pump the second mixture slurry. The operator places the bottom of the drill pipe or bit at a depth that will allow an equivalent of the calculated open-hole volume to remain inside the casing above the casing shoe. The second slurry is pumped at 2 bbls/min (bpm) until it reaches the end of the pipe. Before beginning the hesitation squeeze, the annulus is checked. If no fluid can be seen, the fill-up line is used to fill the hole. The operator then closes the annular BOP (blowout preventer), and pumps the slurry at 1 bpm, for example. This directs the second mixture slurry down hole to the point of loss. The operator can pump one full open hole volume, plus an additional 20–30 bbls, leaving the remainder of the slurry in the casing. Pumping is then begun again at a low rate, e.g. 0.25 to 0.5 bpm. When an incremental pressure increase typically of about 50 psi is obtained, pumping can be discontinued for a short interval, e.g. 10–15 minutes. This procedure is repeated until 50 psi or other selected incremental pressure increase can be maintained, then progressively higher pressures are attempted, for example, in 25–50 psi increments. With this hesitation squeeze method, there will usually be a pressure bleed off each time the pump is stopped. With each successive squeeze, the pressure should stabilize at a higher level. A 200–600 psi squeeze is generally considered to be very good, however, squeeze pressure should desirably not exceed the maximum required fluid density needed in this hole interval. When maximum holding pressure is obtained, the well is preferably shut down for a sufficient time for the lost circulation zone to be sealed by the swelling polymer and the hardened second mixture composition, typically about 4 hours.

Then the operator can bleed the pressure from the annulus slowly, and circulate any water and/or remaining second mixture slurry out of the hole. The drill pipe is staged back into the hole slowly, monitoring the weight indicator checking for bridges. The operator washes to bottom, drilling any second mixture plug encountered. The second mixture slurry will not set-up as hard as cement, so there is little likelihood of sidetracking the hole. Any remaining second mixture slurry may be incorporated into the drilling fluid.

The following examples will further illustrate the novel lost circulation additive and invention method of the present invention. This example is given by way of illustration and not as a limitation of a scope of the invention. Thus, it should be clearly understood that the invention additive and method may be varied to achieve similar results within the scope of the invention.

EXAMPLES

Example 1

A gelling, swelling sealing agent to overcome lost circulation was prepared by mixing together 40% by weight chitosan (obtained from Chitin Works America), 30% by weight sulfamic acid, 15% of ENVIROSORB C superabsorbent polymer, and 15% of ENVIROSORB M superabsorbent polymer.

While drilling at 16,150 feet with a mud weight of 16.5 ppg, complete returns were lost. A conventional 100 bbl LCM pill was pumped without success. A 50 bbl lost circulation pill was prepared by mixing together 37 bbl fresh water, 50 lb sulfamic acid, 500 lb of the gelling, swelling sealing agent, and 22,500 pounds of barite weighting agent. This LC pill was pumped into the well followed by 3 bbl of 16.5 ppg water base mud (to serve as a spacer) and 100 bbl of a second mixture slurry pill containing the EZ SQUEEZE® pre-blend (Turbo-Chem International, Inc.). The pressure was maintained 8 hours to allow the sealing agent to swell and the squeeze to bridge. Excess pill was circulated out of the borehole and drilling resumed with complete returns.

Example 2

While drilling at 16,379 feet with a mud weight of 16.9 ppg, complete returns were lost. A conventional 100 bbl LCM pill was pumped without success. A 50 bbl lost circulation pill was prepared by mixing together 33 bbl fresh water, 10 ppb of the gelling, swelling sealing agent of Example 1, 1 ppb sulfamic acid, 5 gallons of a liquid defoamer, and 23,900 pounds of barite. With the bit at the shoe, the LC pill was pumped to the bit followed by 75 bbl of a 16.9 ppg highly alkaline second mixture slurry pill containing the EZ SQUEEZE® pre-blend. The well was shut in and all 50 bbl of the LC pill and 35 bbl of the EZ SQUEEZE® second mixture pill were pumped into the formation with an ending casing pressure of 500 psi. While holding pressure on the well for 3.5 hours, the casing pressure increased to 925 psi. Drilling resumed without farther losses.

Examples 3–7

Suitable pre-blends are prepared by blending together diatomaceous earth containing a small amount of naturally occurring sodium silicate at less than about 1 weight percent, lime, fine grind paper, and coarse ground wood containing a small amount of naturally occurring sulfate at less than 1 weight percent, according to the following proportions in Table 3 as follows:

TABLE 3

Pre Blend Weight Percentages for Hardening Composition

| Composition | Example 3 | Example 4 | Example 5 | Example 6 | Example 7 |
|---|---|---|---|---|---|
| Diatomaceous Earth | 40 | 37 | 34 | 33 | 30 |
| Lime | 25 | 30 | 34 | 33 | 38 |
| Fine Grind Paper | 5 | 8 | 12 | 10 | 8 |
| Coarse Ground Wood | 30 | 25 | 20 | 24 | 24 |

The present invention is described byway of illustration hereinabove as a non-limiting example. Various changes and modifications will occur to those skilled in the art in view of the foregoing disclosure. All such changes and modifications within the scope and spirit of the appended claims are intended to be embraced thereby.

What is claimed is:

1. A method for decreasing the loss of fluid in a wellbore to a subterranean thief zone in which well drilling or servicing operations are being conducted which comprises the acts of preparing a gellable composition comprising an acidic aqueous liquid and a superabsorbent polymer swellable at alkaline pH, introducing the gellable composition into the thief zone by way of the wellbore, and contacting the gellable composition with an alkaline hardenable composition slurry in an amount sufficient to provide the gellable composition with an alkaline pH.

2. The method of claim 1 wherein the gellable composition has a pH less than about 4.5.

3. The method of claim 1 wherein the alkaline pH is at least about 8.

4. The method of claim 1 wherein the gellable composition further comprises chitosan.

5. The method of claim 4 wherein the chitosan has a degree of acetylation of 0% to about 40%.

6. The method of claim 4 wherein the acidic aqueous liquid contains sulfamic acid therein.

7. The method of claim 6 wherein the gellable composition contains the superabsorbent polymer, chitosan, and sulfamic acid in a weight ratio of 20% to 50% superabsorbent polymer, 30% to 55% chitosan, and 10% to 40% sulfamic acid, and wherein the total concentration of superabsorbent polymer, chitosan, and sulfamic acid is from about 5 pounds per 42 gallon barrel to about 25 pounds per 42 gallon barrel.

8. The method of claim 1 wherein the hardenable composition slurry comprises diatomaceous earth, a suspending agent, lime, a loss control material, sodium silicate, and sulfate.

9. The method of claim 8 wherein the suspending agent is finely divided paper.

10. The method of claim 8 wherein the loss control material comprises micronized cellulose fiber.

11. The method of claim 1 wherein the contacting comprises squeeze injection of the alkaline hardenable composition slurry into the thief zone.

* * * * *